Oct. 11, 1932. E. KLAHN 1,881,673
PROPULSION MEANS FOR AIRCRAFT
Filed Aug. 19, 1931 4 Sheets-Sheet 1
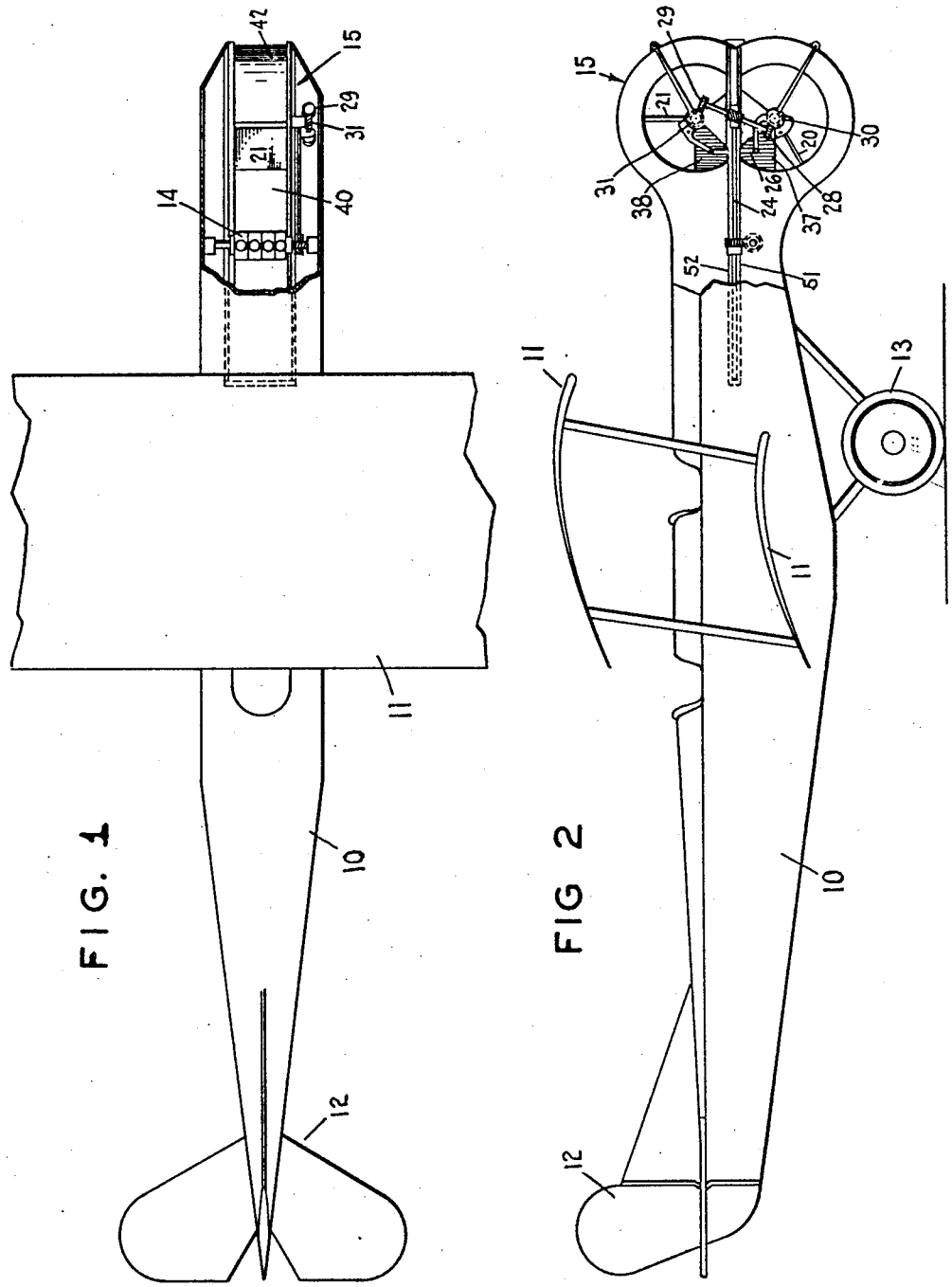
INVENTOR
EMIL KLAHN
BY HIS ATTORNEY Oct. 11, 1932.  E. KLAHN  1,881,673
PROPULSION MEANS FOR AIRCRAFT
Filed Aug. 19, 1931  4 Sheets-Sheet 2

INVENTOR
EMIL KLAHN
BY HIS ATTORNEY

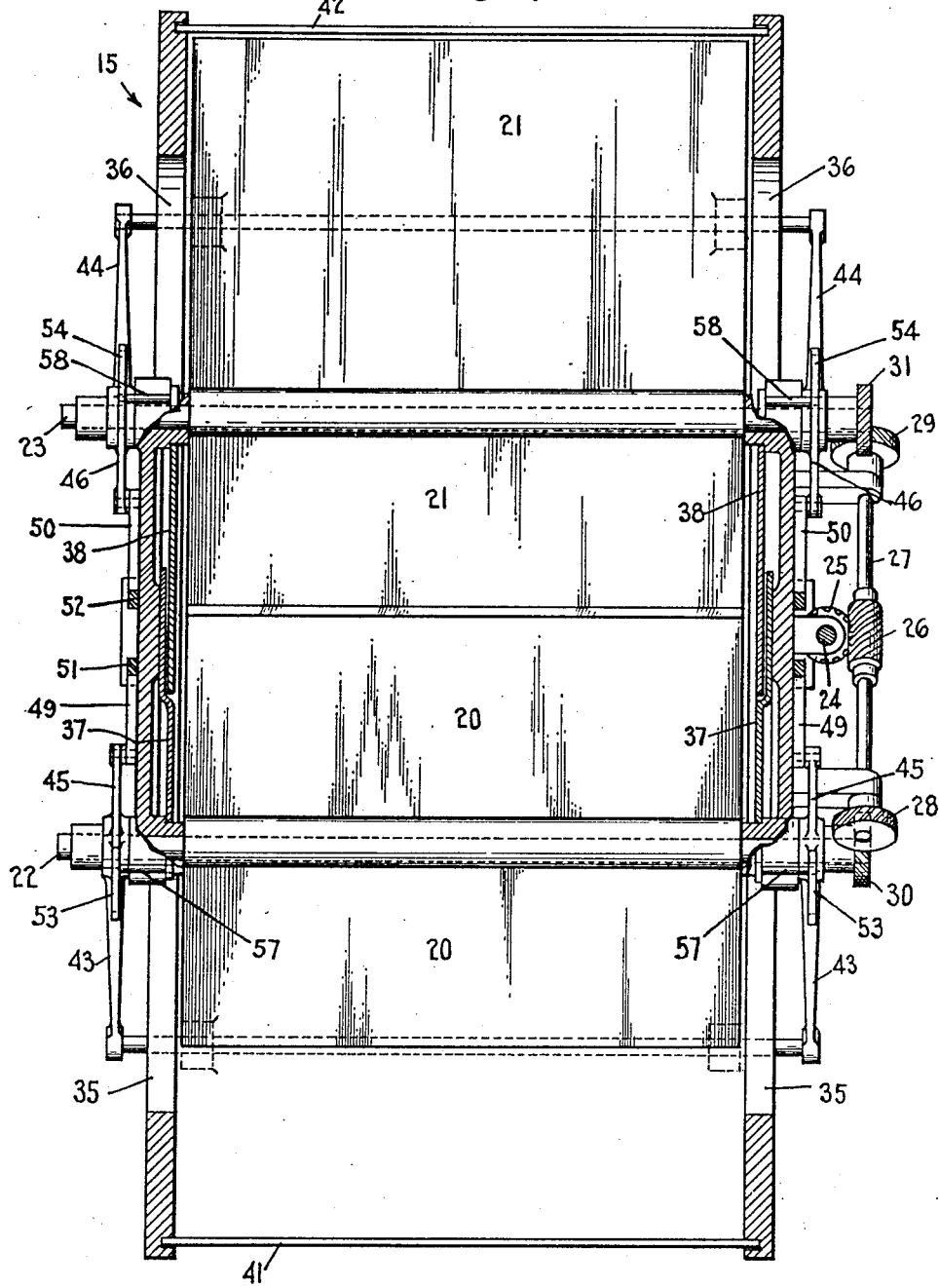

Oct. 11, 1932.  E. KLAHN  1,881,673
PROPULSION MEANS FOR AIRCRAFT
Filed Aug. 19, 1931  4 Sheets-Sheet 4
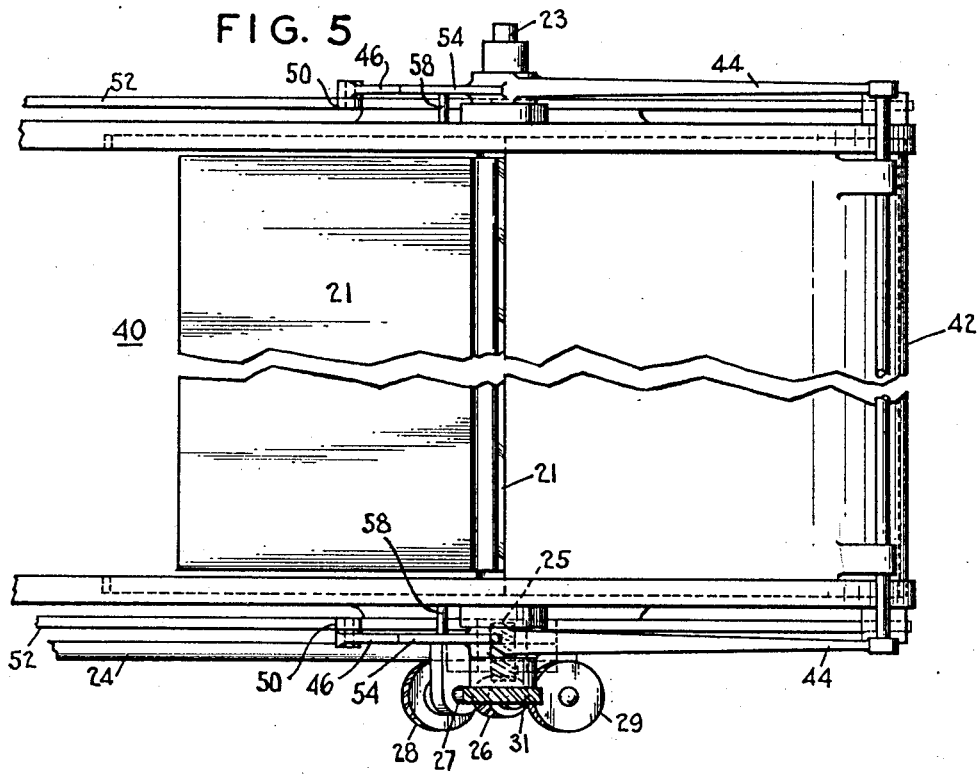
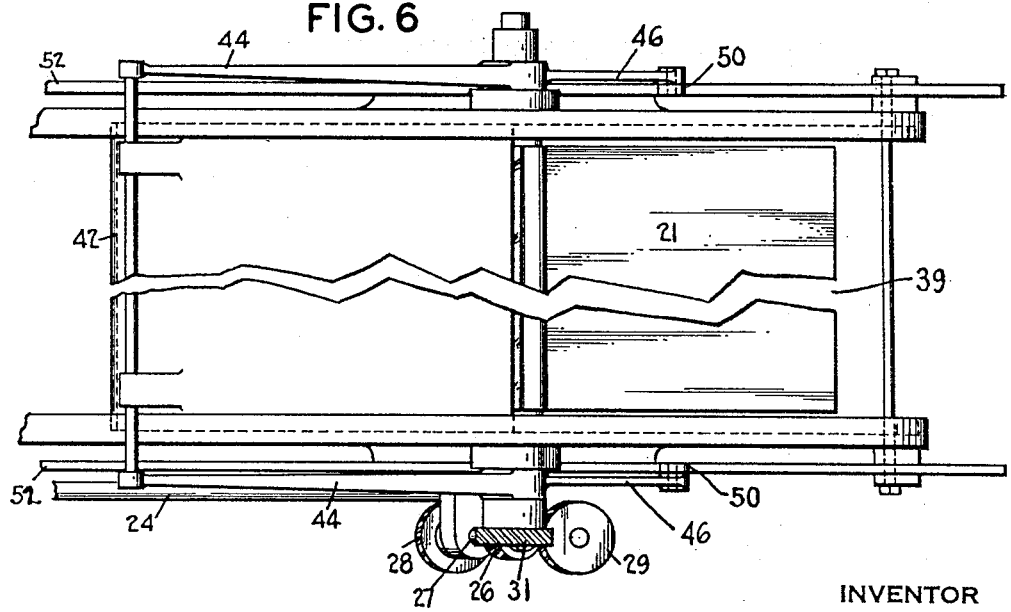
INVENTOR
EMIL KLAHN
BY HIS ATTORNEY Fred'k K Schnutz Patented Oct. 11, 1932

1,881,673

UNITED STATES PATENT OFFICE

EMIL KLAHN, OF NEW VERNON, NEW JERSEY

PROPULSION MEANS FOR AIRCRAFT

Application filed August 19, 1931. Serial No. 557,980.

The invention relates to aircraft and more especially to means for propelling the same, said means being suitable for use either with heavier-than-air craft, or craft of the lighter-than-air type.

The invention has for an object the provision of means for attaining a substantial thrust which is utilized for translating the craft, such as an airplane or dirigible.

A further object of the invention resides in means for varying the magnitude of this thrust to control the velocity of travel of the craft, as well as to maintain the same at a standstill, if desired, with the motor in full action, and to effect a reverse direction of travel.

In carrying out the invention, a suitable motor is arranged to drive a pair of simultaneously operating rotary tangential fans, each pair having the blades or vanes of the fans interlocking or overlapping and arranged to rotate in opposite directions, said blades being suitably spaced to avoid mechanical interference among the same. The fans are suitably housed within casings which are substantially entirely open at the rearward end and normally closed over the forward end. The sides of the housing are partly open to admit freely the incoming air, and the arrangement of blades is such that the rotational axes of the two fans are disposed parallel to each other in a vertical plane and transversely of or normal to the longitudinal axis of the aircraft. When in operation, these fans will direct rearwarly (or forwarly) powerful currents of air, the thrust of which is transmitted to the craft.

Provision is made, furthermore, for controlling openings in these forward walls, as by means of shutters movable thereover so that the intensity of the thrust may be varied in control of the speed of the craft without throttling the motor. By moving these shutters to close the rearward portion of the housing, the forward end becomes open and the craft may be caused to travel in the reverse direction.

Or, the shutters may be placed at an intermediate position where there will be no effective thrust to propel the craft, and thus the fans may be operated without imparting any motion to the craft, which is of value in testing the engine and in taking off.

The nature of the invention, however, will best be understood when described in connection with the accompanying drawings, in which:

Fig. 1 is a plan view of an airplane equipped with the novel propulsion means, a portion of the enclosing housing being broken away to disclose the arrangement of the novel propelling means therein, and Fig. 2 is a similar side elevation.

Fig. 4 is a transverse section through the propelling means and taken on the line 4—4, Fig. 3 of the drawings, and looking in the direction of the arrows.

Figs. 5 and 6 are fragmentary plan views illustrating the speed control means, the former figure showing the shutter adjustment for the maximum thrust, while the latter figure illustrates the shutter position for a minimum or substantially no thrust forward.

Figure 3:
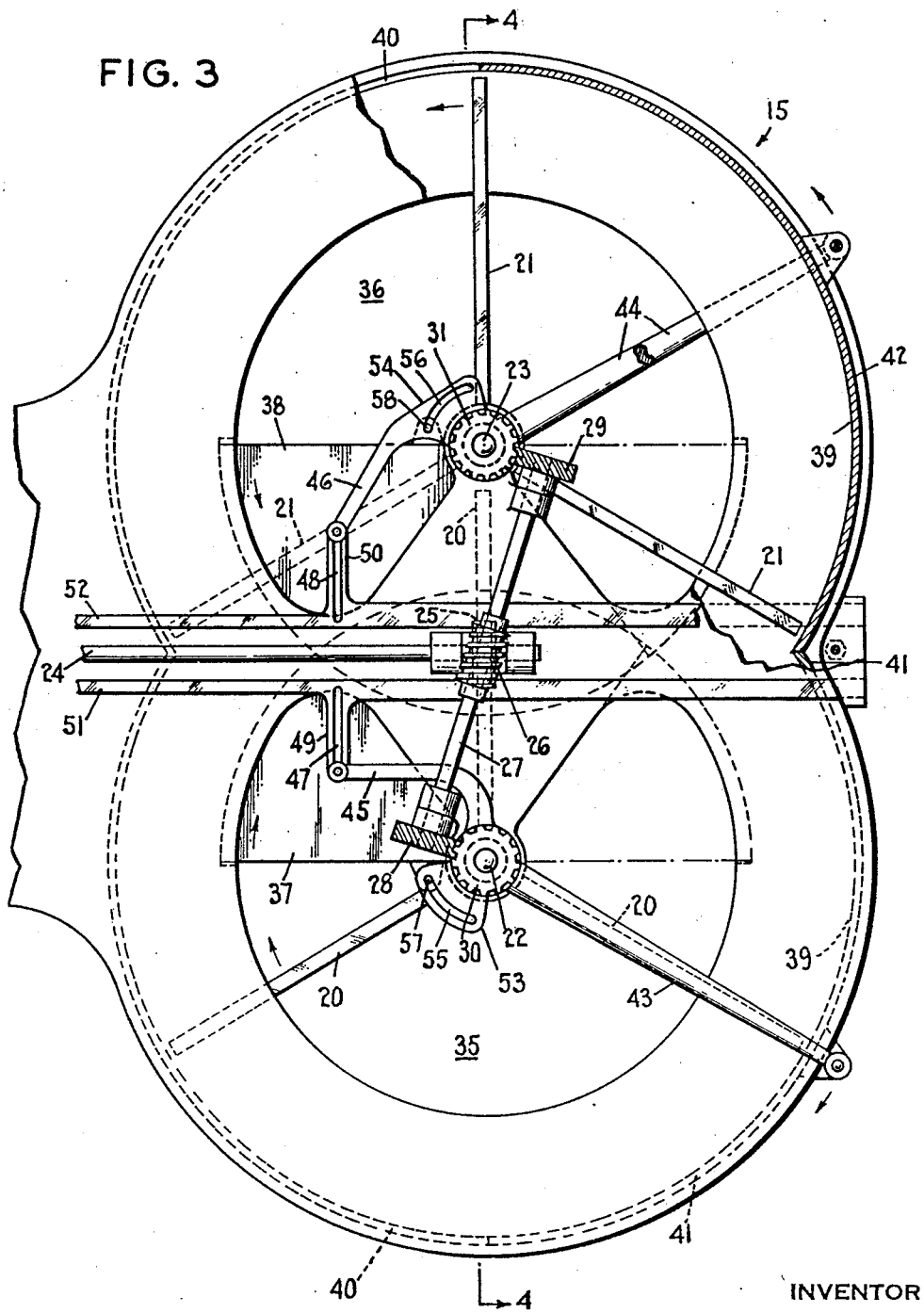
Fig. 3 is an enlarged detail side elevation of the novel propelling means, with portion of the enclosing housing broken away.

Referring to the drawings, 10 designates the body of an airplane of the usual construction having the wings 11, rudder 12 and landing gear 13. The motor 14 for the driving means for the airplane may comprise any of the usual and well-known types of internal combustion motors employed for this purpose, but in place of the usual propeller utilized, the novel driving mechanism is substituted, the same being housed within a suitable casing 15 and in the manner hereinafter more fully set forth.

This mechanism, shown more particularly in Figs. 3 and 4, comprises a pair of tangential fans embodying the sets of blades or vanes 20 and 21 rotatable with shafts 22 and 23, respectively, which are driven from the engine 14, for example, through a shaft 24, the spiral gears 25 and 26 and shaft 27. This shaft at its opposite ends is provided with the spiral gears 28 and 29, respectively, engaging corresponding gears 30 and 31 on the respective shafts 22 and 23.

By this expedient, the blades are driven synchronously but in opposite directions, and the number of blades, spacing and rotation thereof is such that there will be no interference mechanically among said blades when they are rotated.

By thus causing the pair of blades to rotate synchronously in opposite directions in overlapping relationship, not only is space conserved but a maximum reactive force is exerted thereby for propelling the airplane. The arrangement of these blades is similar to the arrangement set forth in my copending application for improvements in aircraft, Serial No. 553,533, but the positioning of the housing is at right angles to that indicated in the aforesaid application. That is to say, the housing is normally entirely closed at the forward end and is fully open at the rearward end, while the sides are open over a portion to provide the openings 35 and 36 therein in order to admit sufficient air to the interior of the fans that the return stroke of a blade operates in a region in which the air has the same direction and velocity so that the blade suffers no appreciable retardation, the effective stroke being in free atmosphere at right angles to the atmosphere. Means are provided, furthermore, for partly closing the openings 35 and 36, as in the provision of pairs of movable sectors 37 and 38 which are arranged to swing about the shafts 22 and 23 as axes and for the purpose hereinafter set forth.

Moreover, openings 39 and 40 are provided respectively over the forward and rear portions of the housing and over which are designed to move shutters 41 and 42, also, rocking about the shafts 22 and 23 as axes and which are normally positioned to close the forward end of the housing. The arrangement is such, also, that the sectors 37 and 38 and the shutters 41 and 42 may be moved simultaneously in order to vary the effective thrust produced by the pairs of fan blades.

For example, the shutters 41 and 42 are carried by the arms 43 and 44 of levers oscillatable, respectively, about the shafts 22 and 23 as axes and whose opposite arms 45 and 46 are movably connected in the slots 47 and 48 of arms 49 and 50 extending from corresponding push rods 51 and 52. Furthermore, arm 45 through an extension 53, and arm 46 through enlarged portion 54, and corresponding arcuate slots 55 and 56 therein, are adapted to engage with pins 57 and 58 of the sectors 37 and 38.

Thus, if the push rods are forced forwardly, the shutters will be moved in the direction indicated by the arrows and to the position shown in Fig. 6 of the drawings. At the same time, the sectors will be rotated to occupy the position indicated by the broken line, Fig. 3 of the drawings, reversing the contours of the side openings 35 and 36. The forward portion of the housing is then entirely open while the rearward portion is entirely closed and the direction of the thrust developed by the fans will be reversed. Intermediate positions will change both the direction and amount of the propelling thrust, which may also be entirely nullified.

I claim:

1. In an aircraft: a supporting structure, a motor carried thereby, means connected with the motor for exerting a horizontal thrust upon the plane and comprising a pair of fans rotatable about horizontal axes parallel to each other and disposed in a vertical plane at right angles to the longitudinal axis of the craft, the blades of the fans being in overlapping relationship, and a casing about the fans open at one of the ends and partly open at the sides.

2. In an aircraft: a supporting structure, a motor carried thereby, means permanently connected with the motor for exerting a horizontal thrust upon the plane and comprising a pair of fans rotatable about horizontal axes parallel to each other and disposed in a verical plane at right angles to the longitudinal axis of the craft, the blades of the fans being in overlapping relationship, and a casing about the fans open at one end and partly open at the sides.

3. In an aircraft: a supporting structure, a motor carried thereby, means connected with the motor for exerting a horizontal thrust upon the plane and comprising a pair of fans rotatable about horizontal axes parallel to each other and disposed in a vertical plane at right angles to the longitudinal axis of the craft, the blades of the fans being in overlapping relationship, a casing having end openings and partly open at the sides, and means normally closing one of the end openings, the other being substantially open.

4. In an aircraft: a supporting structure, a motor carried thereby, means connected with the motor for exerting a horizontal thrust upon the plane and comprising a pair of fans rotatable about horizontal axes parallel to each other and disposed in a vertical plane at right angles to the longitudinal axis of the craft, the blades of the fans being in overlapping relationship, a casing having end openings and partly open at the sides, means normally closing one of the end openings, the other being substantially open, and means to open the closed end of the casing.

5. In an aircraft: a supporting structure, a motor carried thereby, means connected with the motor for exerting a horizontal thrust upon the plane and comprising a pair of fans rotatable about horizontal axes parallel to each other and disposed in a vertical plane at right angles to the longitudinal axis of the craft, the blades of the fans being in overlapping relationship, a casing having end openings and partly open at the sides, means normally closing one of the end openings, the other being substantially open, and means to open the closed end of the casing and simultaneously therewith close the open end thereof.

6. In an aircraft: a supporting structure, a motor carried thereby, means connected with the motor for exerting a horizontal thrust upon the plane and comprising a pair of fans rotatable about horizontal axes parallel to each other and disposed in a vertical plane at right angles to the longitudinal axis of the craft, the blades of the fans being in overlapping relationship, a casing having end openings and partly open at the sides, means normally closing one of the end openings, the other being substantially open, means to open the closed end of the casing, and means to reverse the contour of the side openings.

7. In an aircraft: a supporting structure, a motor carried thereby, means connected with the motor for exerting a horizontal thrust upon the plane and comprising a pair of fans rotatable about horizontal axes parallel to each other and disposed in a vertical plane at right angles to the longitudinal axis of the craft, the blades of the fans being in overlapping relationship, a casing having end openings and partly open at the sides, means normally closing one of the end openings, the other being substantially open, means to open the closed end of the casing, and means to reverse simultaneously therewith the contour of the side openings.

8. In an aircraft: a supporting structure, a motor carried thereby, means connected with the motor for exerting a horizontal thrust upon the plane and comprising a pair of fans rotatable about horizontal axes parallel to each other and disposed in a vertical plane at right angles to the longitudinal axis of the craft, the blades of the fans being in overlapping relationship, a casing about the fans having peripheral ports and circular side openings, shutters movable over the peripheral ports, and sectors movable over the side openings.

9. In an aircraft: a supporting structure, a motor carried thereby, means connected with the motor for exerting a horizontal thrust upon the plane and comprising a pair of fans rotatable about horizontal axes parallel to each other and disposed in a vertical plane at right angles to the longitudinal axis of the craft, the blades of the fans being in overlapping relationship, a casing about the fans having peripheral ports and circular side openings, shutters movable over the peripheral ports, sectors movable over the said side openings, and means interconnecting the shutters and sectors for effecting simultaneous movement thereof.

In testimony whereof I affix my signature.

EMIL KLAHN.